United States Patent [19]

Hugelmann

[11] Patent Number: 4,666,329
[45] Date of Patent: May 19, 1987

[54] BALL JOINTS

[75] Inventor: Peter Hugelmann, Sutton Coldfield, United Kingdom

[73] Assignee: INA Bearing Company Limited, Dyfed, United Kingdom

[21] Appl. No.: 830,660

[22] Filed: Feb. 18, 1986

[30] Foreign Application Priority Data

Feb. 25, 1985 [GB] United Kingdom ............... 8504774

[51] Int. Cl.⁴ ............................................. F16C 11/00
[52] U.S. Cl. .................................... 403/127; 403/131; 403/78
[58] Field of Search ................. 403/131, 127, 128, 78, 403/129; 384/495, 498, 504

[56] References Cited

U.S. PATENT DOCUMENTS

| 1,983,655 | 12/1934 | Bowman et al. | 403/127 |
| 2,632,677 | 3/1953 | Potter | 384/498 |
| 2,853,326 | 9/1958 | Booth | 403/127 |

FOREIGN PATENT DOCUMENTS

| 1089717 | 10/1954 | France | 403/127 |
| 272315 | 9/1928 | Italy | 403/127 |

Primary Examiner—Andrew V. Kundrat
Attorney, Agent, or Firm—Reed Smith Shaw & McClay

[57] ABSTRACT

A ball joint comprises a pin carrying a ball which is pivotally received in a house cup. The ball is supported both axially and radially on the pin by spaced apart sets of angular contact rolling bearings.

11 Claims, 3 Drawing Figures

BALL JOINTS

FIELD OF THE INVENTION

This invention relates to ball joints.

BACKGROUND OF THE INVENTION AND PRIOR ART

Ball joints are often used in the front wheel suspension of automotive vehicles. The ball joints permit steering of the wheels while accommodating changes in angle between the wheel and the suspension members. In conventional ball joints, a pin on which the wheel is mounted carries a ball, which is rigid with the pin, the ball being received in a cup. During both rotation and pivoting of the pin, the surface of the ball slides over a lining of the cup. Thus, since both modes of motion take place between the same sliding surfaces, they are subject to the same level of frictional resistance. However, while relatively high friction is of some advantage for the pivoting movement, in order to give a damping effect to the suspension, low friction rotary movement is often desirable in order to reduce the forces required for steering.

British Patent Specification No. 758805 discloses a ball joint having a ball element which is rotatably mounted on a stud. A thrust bearing comprising balls is provided to withstand axial loads in one direction. The stud is a sliding fit in the ball element, and radial and tilting loads are transmitted by direct contact between the stud and the ball element. This direct contact gives rise to undesirable friction resisting relative rotation between the stud and the ball element.

SUMMARY OF THE PRESENT INVENTION

According to the present invention, there is provided a ball joint comprising a pin carrying a ball which is received in a cup for pivotal movement relative to the cup about pivot axes perpendicular to the longitudinal axis of the pin, the pin being mounted in the ball by means of two axially spaced rows of angular contact rolling bearing elements, whereby the pin is rotatable about its longitudinal axis relative to the ball.

The term "angular contact" means that the line of action of the compressive force applied to each rolling element in normal operation extends obliquely with respect to the longitudinal axis of the pin. Usually, the lines of action for the rolling elements in each row will be inclined in the opposite direction to those in the other row. Thus, one row will resist relative axial displacement between the pin and the ball in one direction and the other row will resist such displacement in the other direction. The rolling elements may, for example, be balls or tapered, spherical or cylindrical rollers.

The ball carried by the pin may have a part-spherical surface, but this is not essential provided that the ball will cooperate with the cup in a manner which permits the required pivotal movement.

Preferably, the pin is provided with a shoulder and the bearing elements are pre-loaded between the shoulder and a nut cooperating with a threaded portion of the pin. The bearing elements may run directly on a suitably formed surface of the pin, or they may run on separate raceways fitted to the pin.

DETAILED DESCRIPTION OF PREFERRED EMBODIMENTS

Figure 1:
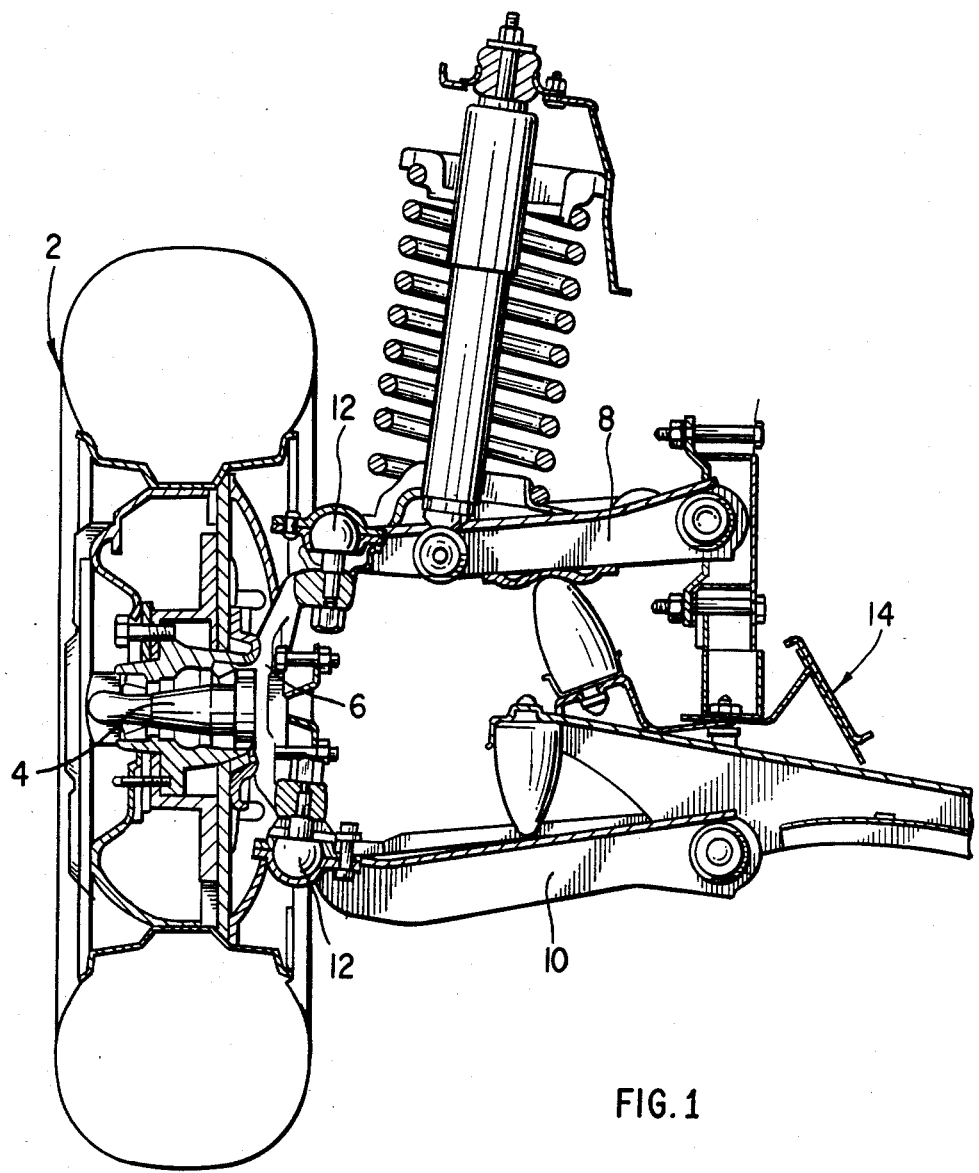
FIG. 1 shows a motor vehicle front wheel assembly.

FIG. 1 shows a wheel 2 which can rotate on a stub axle 4 mounted on a carrier 6. The carrier 6 is connected to upper and lower wishbones 8 and 10 by upper and lower ball joints 12. At the ends away from the ball joints 12, the wishbones 8 and 10 are pivotally connected to the frame 14 of the vehicle.

It will be appreciated that, as the wheel 2 is steered, it will turn about the coinciding axes of the pins of the ball joints 12. As the wheel 2 rises and falls with respect to the frame 14 the ball joints 12 will pivot with respect to the wishbones 8 and 10.

Figure 2:
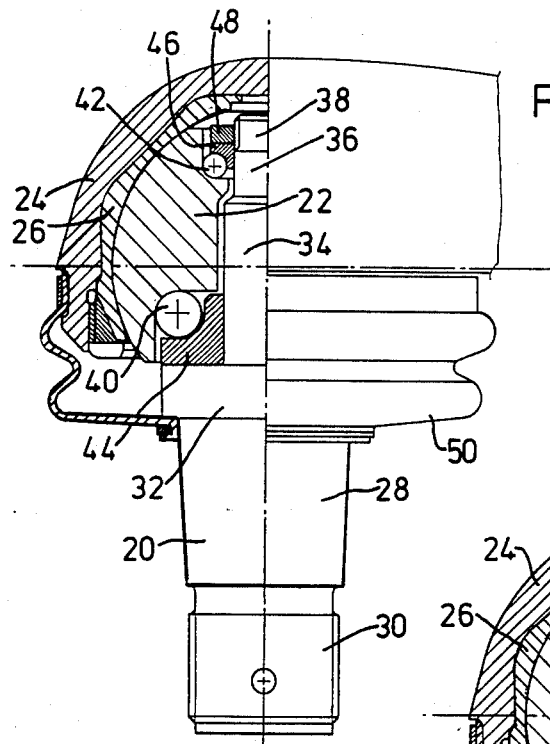
FIG. 2 shows a ball joint suitable for use in the assembly of FIG. 1.

FIG. 2 shows a ball joint in accordance with the present invention.

The ball joint comprises a pin 20 on which is mounted a ball 22. The ball 22 is received in an outer housing or cup 24. A liner 26, for example of the plastic polytetrafluoroethylene, is provided between the cup 24 and the ball 22.

The pin 20 has a tapered portion 28 which, in use, is received in a correspondingly tapered hole in the stub axle carrier 6, where it is retained by a nut screwed onto a screw-threaded portion 30 of the pin. At the end away from the portion 30, the tapered portion 28 terminates at a flange 32. A cylindrical portion 34 projects from the flange 32. At its end away from the flange 32, the cylindrical portion 34 is provided with a further cylindrical portion 36 of reduced diameter. There is a screw-threaded portion 38 at the free end of the portion 36.

The ball 22 is supported on the pin 20 by two rows, of angular contact rolling elements in the form of balls 40 and 42. The lower set of balls 40 run on an arcuate raceway 44 which itself seats on the soulder defined by reduced cylindrical portion 34 on pin 20 and flange 32 and an opposing recess in the underside portion of ball 22. The upper set of rolling elements 42 run in inverted raceway 46 located adjacent reduced shank portion 36 and also defined by a second arcuate recess in the upper inner surface of mounting ball 22. A nut 48 is screwed onto the portion 38 and tightened against the raceway 46 to apply a predetermined pre-load to the bearing elements 40 and 42 in order to provide clearance-free running.

A rubber boot 50 retains lubricant for the bearings 40 and 42 in the assembly, and prevents the ingress of dirt.

Figure 3:
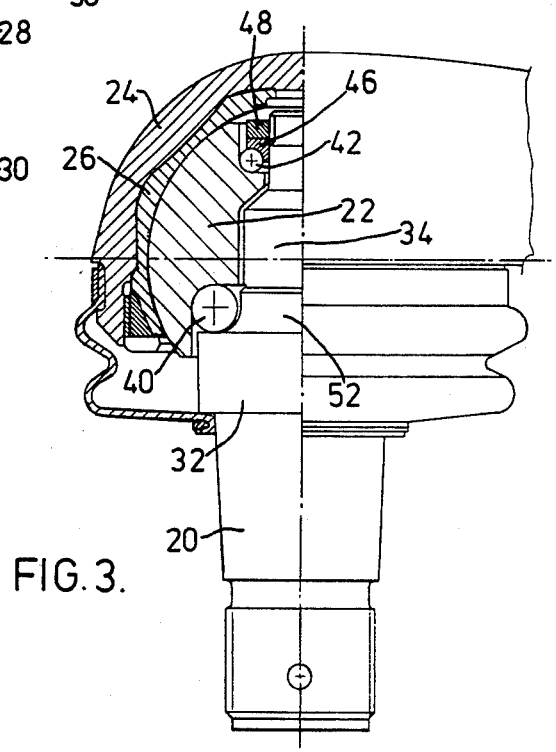
FIG. 3 shows an alternative ball joint suitable for use in the assembly of FIG. 1.

FIG. 3 shows a ball joint which is substantially the same as that shown in FIG. 2 except that the balls 40 run directly on a raceway 52 formed between the flange 32 and the cylindrical portion 34.

In both embodiments, both rows of balls 40, 42 preferably comprise full complement arrangements, but alternatively, distance pieces could be provided between adjacent balls or a unit cage could be provided to space the balls apart from each other. In another alternative, the balls 40 and 42 of either row could be replaced by tapered, spherical or cylindrical rollers.

In the embodiments of FIGS. 2 and 3, there is no direct contact between the pin 20 and the ball 22 in each case. Instead, the ball 22 is supported on the pin 20 solely by the balls 40 and 42 which are disposed to transmit axial and radial forces between the pin and the ball. The coefficient of friction between the ball 22 and the liner 26 may be in the range 0.03 to 0.08 (or even up to 0.10) depending on the load and the sliding velocity. By contrast, the coefficient of friction for the combined rolling bearing comprising the balls 40 and 42 may be in the range 0.002 to 0.003 depending on the preload applied by the nut 48 and the viscosity of the lubricant. Thus a ball joint is provided in which the resistance to rotation about the axis of the pin 20 is less than 10% of the resistance to pivoting about axes perpendicular to the axis of the pin 20. The resistance to rotation would be slightly higher if tapered, spherical or cylindrical rolling elements were used in place of the balls 40 and 42, but the load bearing capacity is increased.

I claim:
1. Ball joint comprising:
   (a) a pin;
   (b) a ball carried by the pin;
   (c) a housing member internally conformed to receive the ball for pivotal movement relative to the housing about pivot axes perpendicular to the longitudinal axis of the pin; and
   (d) first and second axially spaced apart rows of angular contact roller bearing elements, which support the pin for rotation about its longitudinal axis relative to the ball, and in which the bearing elements of one of the rows are of an actual diameter differing from the elements of the other row.
2. A ball joint as claimed in claim 1, wherein the lines of action of compressive forces applied to the bearing elements in each row are inclined to the longitudinal axis of the pin in the opposite direction to the lines of action of the compressive forces applied to the bearing elements in the other row.
3. A ball joint as claimed in claim 1 wherein the pin is provided with an annular shoulder and an adjustable retaining member, the bearing elements being loaded between the shoulder and the adjustable retaining member.
4. A ball joint as claimed in claim 3, wherein the adjustable member is a nut engaging a screw threaded portion of the pin.
5. A ball joint as claimed in claim 1, wherein the bearing elements of at least one of the rows run directly on a surface of the pin.
6. A ball joint as claimed in claim 1, wherein the bearing elements of at least one of the rows run on a separate raceway fitted to the pin.
7. A ball joint as claimed in claim 1, wherein the bearing elements are balls.
8. A ball joint as claimed in claim 1, wherein the bearing elements are selected from the group of tapered, spherical and cylindrical rollers.
9. A ball joint as claimed in claim 1, wherein the row having the smaller bearing element is nearer to the pin surface than the other row.
10. A ball joint as claimed in claim 1, wherein the ball is supported by the bearing elements which are out of direct contact with the pin.
11. A ball joint as claimed in claim 1, wherein a ring-like member is provided and is sized to make sliding contact along its inner surface with an intermediate area on the surface of the pin and to be retained thereon by having an annular recess on its outer surface adapted to serve as a raceway for the adjacent bearing elements.

* * * * *

UNITED STATES PATENT AND TRADEMARK OFFICE
CERTIFICATE OF CORRECTION

PATENT NO. : 4,666,329

DATED : May 19, 1987

INVENTOR(S) : Peter Hugelmann

It is certified that error appears in the above-identified patent and that said Letters Patent is hereby corrected as shown below:

Column 2, line 36, delete the comma after "row"

Column 2, line 39, "soulder" should read -- shoulder --.

Column 4, line 23, "element" should read -- elements --.

Signed and Sealed this

Twenty-seventh Day of October, 1987

*Attest:*

DONALD J. QUIGG

*Attesting Officer*  *Commissioner of Patents and Trademarks*